US012618447B2

(12) United States Patent
Takagi

(10) Patent No.: US 12,618,447 B2
(45) Date of Patent: May 5, 2026

(54) METHOD OF MANUFACTURING SHOCK ABSORBER

(71) Applicant: Hitachi Astemo, Ltd., Hitachinaka (JP)

(72) Inventor: Wataru Takagi, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 38 days.

(21) Appl. No.: 18/688,873

(22) PCT Filed: Sep. 9, 2022

(86) PCT No.: PCT/JP2022/033847
§ 371 (c)(1),
(2) Date: Feb. 3, 2025

(87) PCT Pub. No.: WO2023/067941
PCT Pub. Date: Apr. 27, 2023

(65) Prior Publication Data
US 2025/0361918 A1 Nov. 27, 2025

(30) Foreign Application Priority Data
Oct. 22, 2021 (JP) ................................. 2021-173087

(51) Int. Cl.
*B23P 11/00* (2006.01)
*B23P 19/04* (2006.01)
*F16F 9/32* (2006.01)

(52) U.S. Cl.
CPC .......... *F16F 9/3271* (2013.01); *B23P 19/048* (2013.01); *B60G 2206/41* (2013.01);
(Continued)

(58) Field of Classification Search
CPC ...... F16F 9/3271; F16F 2226/045; F16F 9/54;
F16F 2230/2205; B23P 19/048;
(Continued)

(56) References Cited

FOREIGN PATENT DOCUMENTS

| JP | 7-269625 | 10/1995 |
| JP | 2005-76713 | 3/2005 |

(Continued)

OTHER PUBLICATIONS

English translation of JP-2019027460-A (Year: 2019).*
(Continued)

*Primary Examiner* — Jun S Yoo
(74) *Attorney, Agent, or Firm* — Wenderoth, Lind & Ponack, L.L.P.

(57) ABSTRACT

A damping unit and an actuating unit of a damping force adjustment mechanism are inserted into a case provided to a side portion of an outer tube (outer cylinder). After the damping unit and the actuating unit are fastened together, a shock absorber main body with an upper end (another end) of a piston rod facing down is placed in a spring seat fixing jig, and a spring seat is fixed (press-fitted) over the shock absorber main body. A spring seat support portion of the spring seat fixing jig is not arranged between the damping force adjustment mechanism or a bracket and the spring seat. Thus, the spring seat can be fixed (press-fitted) over the shock absorber main body (outer cylinder) without being restricted by an arrangement of the damping force adjustment mechanism or the bracket.

5 Claims, 5 Drawing Sheets

(52) U.S. Cl.
CPC ............... *B60G 2206/82092* (2013.01); *F16F 2226/045* (2013.01)

(58) Field of Classification Search
CPC ............. B23P 2700/14; B60G 2206/41; B60G 2206/82092
See application file for complete search history.

(56) References Cited

FOREIGN PATENT DOCUMENTS

| | | | | |
|---|---|---|---|---|
| JP | 2015-197126 | 11/2015 | | |
| JP | 2016-176543 | 10/2016 | | |
| JP | 2019-27460 | 2/2019 | | |
| JP | 2019027460 A | * 2/2019 | | |
| WO | WO-2017122385 A1 | * 7/2017 | ............. | B21D 51/18 |

OTHER PUBLICATIONS

English translation of WO-2017122385-A1 (Year: 2017).*
International Search Report issued Nov. 8, 2022 in International Application No. PCT/JP2022/033847, with English translation.
Written Opinion of the International Searching Authority issued Nov. 8, 2022 in International Application No. PCT/JP2022/033847, with English translation.

* cited by examiner

METHOD OF MANUFACTURING SHOCK ABSORBER

TECHNICAL FIELD

The present invention relates to a method of manufacturing a damping force adjustable shock absorber that adjusts a damping force by controlling a flow of a working fluid caused along with a stroke of a piston rod.

BACKGROUND ART

In Patent Literature 1, there is described a damping force adjustable hydraulic shock absorber of control-valve side-mounting type (hereinafter referred to as "control-valve side-mounting type shock absorber"). In the control-valve side-mounting type shock absorber, a side wall of a case 25 is crimped toward an annular groove 60 formed in an outer periphery of a solenoid case 42 to form a crimped portion 61 in the side wall of the case 25. In this manner, the solenoid case 42 is fixed to the case 25.

CITATION LIST

Patent Literature

PTL 1: JP 2015-197126 A

SUMMARY OF INVENTION

Technical Problem

In general, a shape and an arrangement of a spring seat or a bracket, each to be fixed to a shock absorber main body (outer cylinder), differ for each vehicle model. In the control-valve side-mounting type shock absorber, an arrangement of a control valve (damping force adjustment mechanism) or the spring seat is determined in accordance with a vehicle layout. In the control-valve side-mounting type shock absorber described above, after the spring seat is fixed to the outer cylinder, a damping unit (valve mechanism unit) and an actuating unit (actuator) of the damping force adjustment mechanism that is provided to a side portion of the outer cylinder are fastened together with a fastening jig.

When a distance between the control valve (damping force adjustment mechanism) and the spring seat in an axial direction is short (for example, 30 mm or less), however, the fastening jig cannot be brought closer to a case accommodating the damping force adjustment mechanism, which is to be joined to the side portion of the outer cylinder. Thus, after the damping unit and the actuating unit of the damping force adjustment mechanism are fastened together with the fastening jig, the spring seat is press-fitted over the shock absorber main body (outer cylinder). In this case, the spring seat is required to be restricted from rotating in a direction about an axis (is required to be positioned) with respect to the shock absorber main body. However, there arises a problem in that a rotation restricting jig for the spring seat may interfere with the control valve or the bracket.

The present invention has an object to provide a method of manufacturing a shock absorber, which enables press-fitting of a spring seat over a shock absorber main body without being restricted by an arrangement of a damping force adjustment mechanism or a bracket.

Solution to Problem

According to the present invention, there is provided a method of manufacturing a shock absorber, the shock absorber including: an inner cylinder; an outer cylinder having a bottomed tubular shape, which defines, in combination with the inner cylinder, a reservoir; a piston inserted into the inner cylinder; a piston rod having one end coupled to the piston and another end extending to an outside through an opening of the outer cylinder; a damping force adjustment mechanism provided to a side portion of the outer cylinder, the damping force adjustment mechanism including a damping unit capable of adjusting a damping force and an actuating unit capable of actuating the damping unit; and a spring seat, which is fixed to the outer cylinder and is configured to receive a suspension spring, the method including: a fastening step of fastening the damping unit and the actuating unit together, which are provided to the side portion of the outer cylinder; and a spring-seat fixing step of fixing the spring seat to the outer cylinder after the fastening step.

The method of manufacturing a shock absorber according to one embodiment of the present invention enables press-fitting of a spring seat over a shock absorber main body without being restricted by an arrangement of a damping force adjustment mechanism or a bracket.

DESCRIPTION OF EMBODIMENTS

Figure 1:
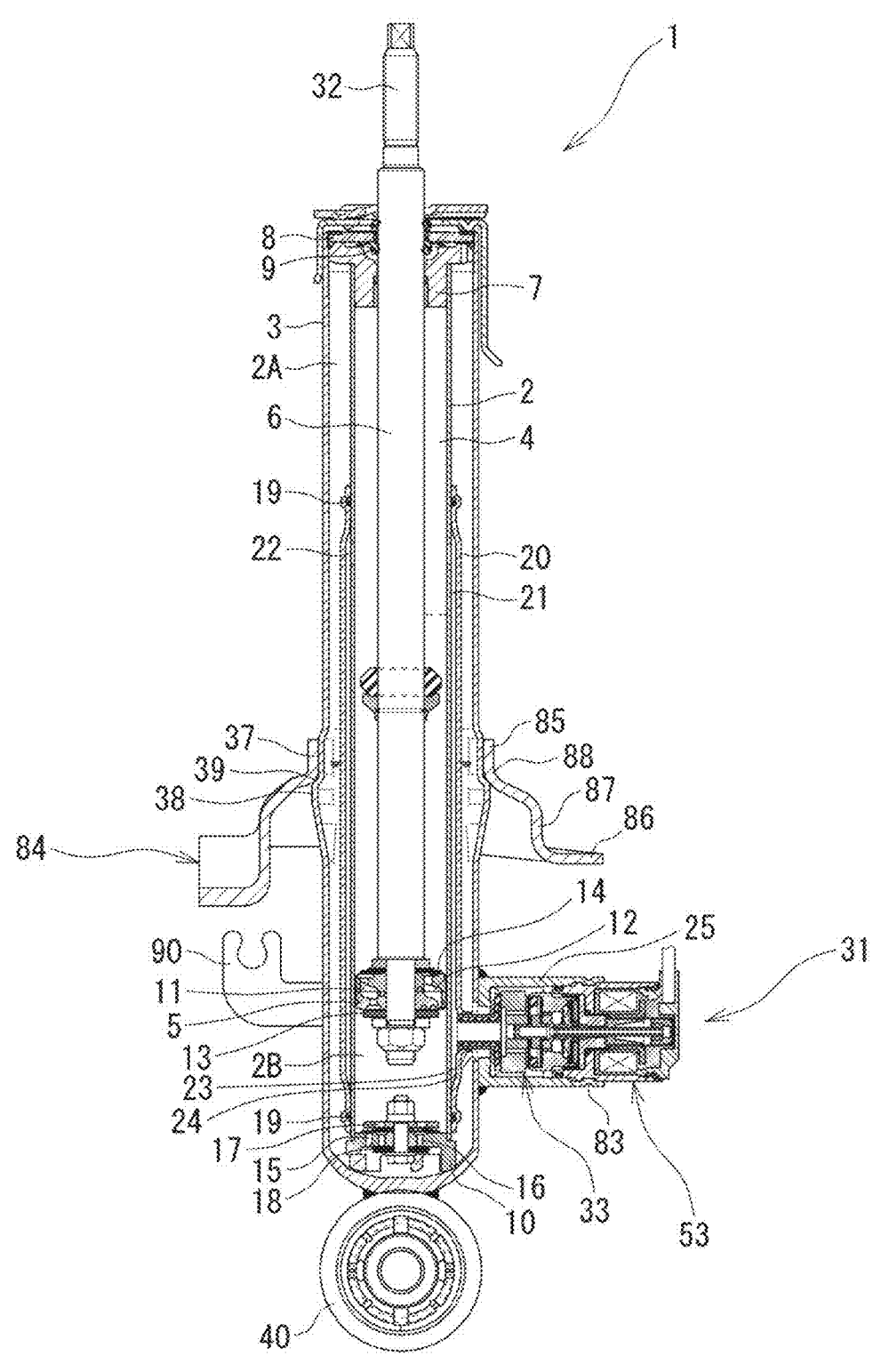
FIG. 1 is a sectional view of a shock absorber according to an embodiment.

One embodiment of the present invention is described with reference to the accompanying drawings. A shock absorber 1 illustrated in FIG. 1 is a damping force adjustable hydraulic shock absorber of a so-called control-valve side-mounting type in which a damping force adjustment mechanism 31 is horizontally mounted to a side portion of an outer tube 3 (outer cylinder). For convenience of description, a vertical direction in FIG. 1 is referred to as "vertical direction".

The shock absorber 1 has a multi-cylinder structure in which a cylinder 2 is provided inside the outer tube 3. A reservoir 4 is defined between the cylinder 2 and the outer tube 3. A piston 5, which partitions a space inside the cylinder 2 into two chambers being a cylinder upper chamber 2A and a cylinder lower chamber 2B, is slidably fitted into the cylinder 2. The shock absorber 1 includes a piston rod 6. The piston rod 6 has a lower end (one end) coupled to the piston 5 and an upper end 32 (another end) passing through the cylinder upper chamber 2A to project to an outside from an opening of the outer tube 3. The piston rod 6 is inserted through a rod guide 7 that is fitted into an upper end of the cylinder 2. A space between the cylinder upper chamber 2A and the outside is sealed with an oil seal 9 mounted to a washer 8.

An extension-side passage 11 and a compression-side passage 12 that allow communication between the cylinder upper chamber 2A and the cylinder lower chamber 2B are defined in the piston 5. A disc valve 13 (relief valve) is provided to the extension-side passage 11. When a pressure on the cylinder upper chamber 2A side reaches a preset pressure, the disc valve 13 is opened to release the pressure on the cylinder upper chamber 2A side to the cylinder lower chamber 2B side. A disc valve 14 (check valve) is provided to the compression-side passage 12. The disc valve 14 allows a flow of a working fluid from the cylinder lower chamber 2B to the cylinder upper chamber 2A.

A base valve 10 that separates the cylinder lower chamber 2B and the reservoir 4 from each other is provided to a lower end of the cylinder 2. An extension-side passage 15 and a compression-side passage 16 that allow communication between the cylinder lower chamber 2B and the reservoir 4 are defined in the base valve 10. A disc valve 17 (check valve) is provided to the extension-side passage 15. The disc valve 17 allows a flow of the working fluid from the reservoir 4 side to the cylinder lower chamber 2B side. A disc valve 18 (relief valve) is provided to the compression-side passage 16. When a pressure on the cylinder lower chamber 2B side reaches a preset pressure, the disc valve 18 is opened to release the pressure on the cylinder lower chamber 2B side to the reservoir 4 side. As the working fluid, an oil liquid is enclosed in the cylinder 2, and an oil liquid and a gas are enclosed in the reservoir 4.

A separator tube 20 is mounted on an outer periphery of the cylinder 2 with a pair of upper and lower sealing members 19, 19 interposed therebetween. An annular oil path 21 is defined between the cylinder 2 and the separator tube 20. A passage 22 that allows communication between the annular oil path 21 and the cylinder upper chamber 2A is formed through an upper part of a side wall of the cylinder 2. A connection port 23 having a cylindrical shape is formed in a lower part of a side wall of the separator tube 20. The connection port 23 projects rightward in FIG. 2. A mounting hole 24 that is coaxial with the connection port 23 is formed in a side wall of the outer tube 3. A case 25 having a cylindrical shape is provided on the side wall of the outer tube 3 so as to surround the mounting hole 24.

Figure 2:
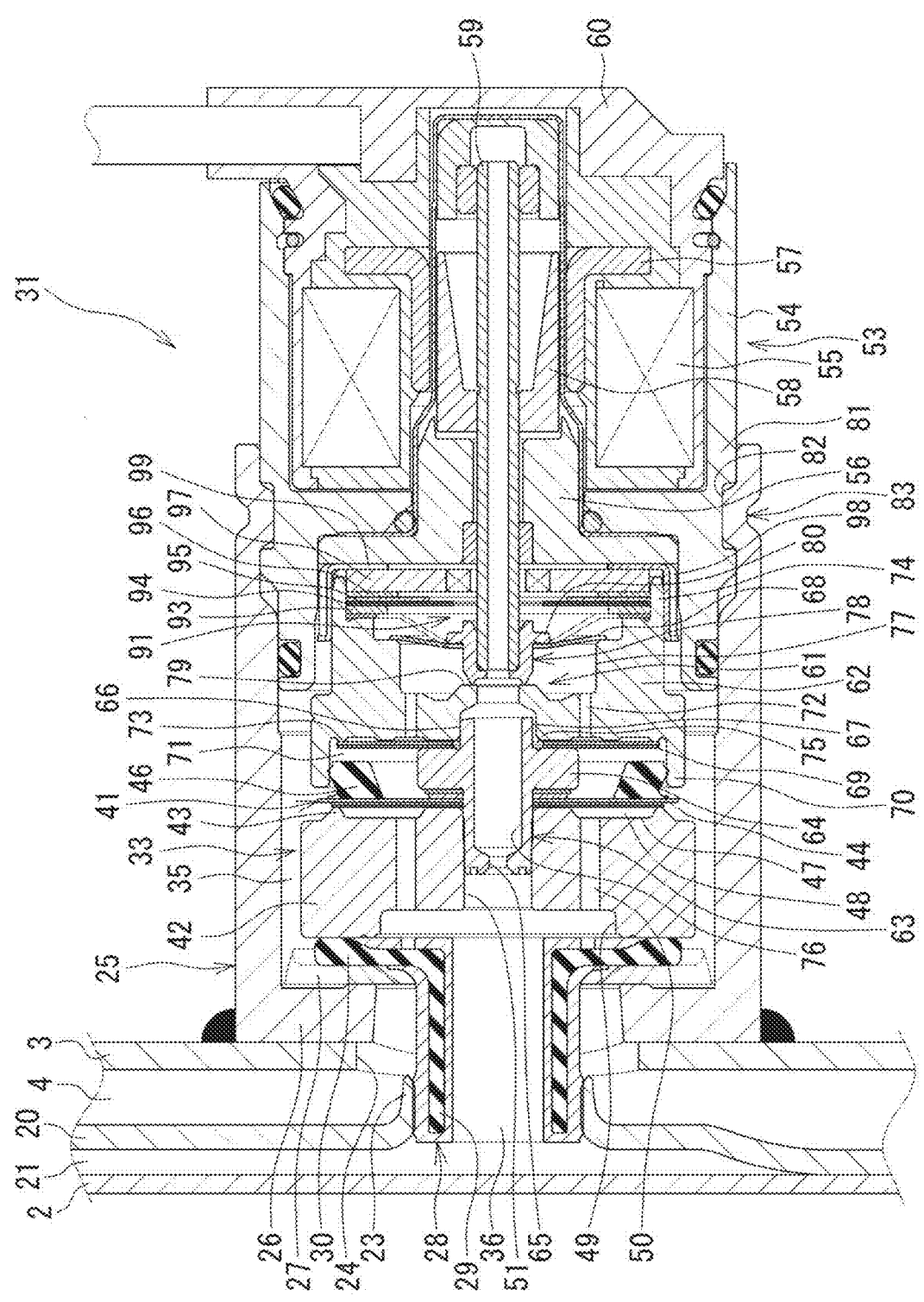
FIG. 2 is an enlarged view of a damping force adjustment mechanism of FIG. 1.

As illustrated in FIG. 2, the damping force adjustment mechanism 31 is accommodated in the case 25. The damping force adjustment mechanism 31 includes a valve block 33 (damping unit) and a solenoid block 53 (actuating unit). The valve block 33 is formed by integrating valve components together. The solenoid block 53 is formed by integrating solenoid components together. The valve block 33 includes a back-pressure main valve 41, a pilot valve 61 that controls a valve opening pressure for the main valve 41, and a fail-safe valve 91 provided on a downstream side of the pilot valve 61.

A joint member 28 is inserted through the mounting hole 24 of the outer tube 3. The joint member 28 has a tubular portion 29 and a flange portion 30 (outer flange). The tubular portion 29 has a cylindrical shape, and its left end illustrated in FIG. 2 is inserted into the connection port 23. The flange portion 30 is formed at a peripheral edge of a right opening of the tubular portion 29 in FIG. 2, and is accommodated in the case 25. The tubular portion 29 and the flange portion 30 are covered with a sealing material. A left end surface of the flange portion 30 in FIG. 2 is brought into abutment against a right end surface of an inner flange portion 26 of the case 25 in FIG. 2, and a right end surface of the flange portion 30 in FIG. 2 is brought into abutment against a left annular end surface (reference symbol is omitted) of a main body 42 in FIG. 2. A flow path 35 defined along an outer periphery of the valve block 33 and the reservoir 4 are brought into communication with each other through a plurality of passages 27 (grooves) formed in the inner flange portion 26 of the case 25.

The valve block 33 includes the main body 42 having an annular shape, a pilot body 62 having an annular shape, and a pilot pin 63. The pilot pin 63 couples the main body 42 and the pilot body 62 to each other. A seat portion 43 having an annular shape is formed on an outer peripheral edge portion of a right end surface of the main body 42 in FIG. 2. An outer peripheral edge portion of a main disc 44 is brought into abutment against the seat portion 43 so as to be seatable thereon and separatable therefrom. An inner peripheral portion of the main disc 44 is clamped between an inner peripheral portion of the main body 42 and a large-diameter portion 64 of the pilot pin 63.

A packing 46 having an annular shape is provided on an outer peripheral portion of a right end surface of the main disc 44 in FIG. 2. The main body 42 has an annular recessed portion 47 formed in the right end surface thereof in FIG. 2. When the main disc 44 is seated on the seat portion 43, an annular passage 48 is defined between the main body 42 and the main disc 44. The annular passage 48 is brought into communication with the flow path 35 defined along the outer periphery of the main body 42 through an orifice (reference symbol is omitted) formed in the main disc 44. The main body 42 has a recessed portion 49 formed in a center of the left end surface thereof in FIG. 2. The recessed portion 49 and the annular recessed portion 47 (annular passage 48) in the right end surface in FIG. 2 are brought into communication with each other through a plurality of passages 50 (only two thereof are illustrated in FIG. 2) formed through the main body 42.

The pilot pin 63 is formed in a bottomed cylindrical shape having an open end on its right end surface in FIG. 2. The pilot pin 63 has an introduction orifice 65 formed through its bottom portion on the left side in FIG. 2. A left end of the pilot pin 63 in FIG. 2 is press-fitted into a shaft hole 51 of the main body 42. A right end of the pilot pin 63 in FIG. 2 is press-fitted into a recessed portion 66 formed in a left end surface of the pilot body 62 in FIG. 2. A plurality of passages 67 (grooves) (only one thereof is illustrated in FIG. 2) extending in an axial direction (horizontal direction in FIG. 2) are formed in an outer peripheral surface of the right end of the pilot pin 63 in FIG. 2.

The pilot body 62 is formed in a substantially bottomed cylindrical shape with a right open end in FIG. 2. A flexible disc 69, which is clamped between an inner peripheral portion of the pilot body 62 and the large-diameter portion 64 of the pilot pin 63, is provided on the left end surface of the pilot body 62 in FIG. 2. The pilot body 62 has a cylindrical portion 70. The cylindrical portion 70 is formed on an outer peripheral portion of a left end of the pilot body 62 in FIG. 2 and is coaxial with the pilot body 62. The packing 46 for the main valve 41 is slidably brought into abutment against an inner peripheral surface (reference symbol is omitted) of the cylindrical portion 70. The abutment of the packing 46 defines a pilot chamber 71 on a right side (back) of the main disc 44 in FIG. 2. A pressure in the pilot chamber 71 acts in a valve-closing direction with respect to the main disc 44 (direction of pressing the main disc 44 against the seat portion 43).

The pilot body 62 has a plurality of passages 72 (only two thereof are illustrated in FIG. 2) passing through its bottom portion in the axial direction. The passages 72 are formed equiangularly. When the flexible disc 69 is seated on a seat portion 73 having an annular shape formed on a left end surface of the pilot body 62 in FIG. 2, an annular passage (reference symbol is omitted) is defined on an inner side (inner periphery) of the seat portion 73. The annular passage communicates with a left end of each of the passages 72 in FIG. 2. When being warped under an internal pressure of the pilot chamber 71, the flexible disc 69 provides volume elasticity to the pilot chamber 71.

The flexible disc 69 is formed by laminating a plurality of discs. The flexible disc 69 has a cutout 75 in its inner peripheral portion. The cutout 75 allows communication between the passages 67 and the pilot chamber 71. Thus, the oil liquid in the annular oil path 21 is introduced into the damping force adjustment mechanism 31 via a flow path 36 (shaft hole) of the joint member 28, and is then introduced into the pilot chamber 71 via an introduction passage, that is, the introduction orifice 65, a shaft hole 76 of the pilot pin 63, the passages 67, and the cutout 75 in the flexible disc 69.

The pilot body 62 has a recessed portion 77 that is formed in its right end surface in FIG. 2 to have an open end. The recessed portion 77 has a seat portion 79 (valve seat) having an annular shape formed on its bottom portion. A valve body 78 is brought into abutment against the seat portion 79 so as to be seatable thereon and separatable therefrom. The seat portion 79 is formed along a peripheral edge of an opening of the recessed portion 66 of the pilot body 62, through which the working fluid passes. The valve body 78 is formed in a substantially cylindrical shape and has a left end formed in a tapered shape in FIG. 2. A spring receiving portion 80 having an outward flange shape is formed at a right end of the valve body 78 in FIG. 2. The valve body 78 is urged by a pilot spring 68 in a direction (rightward in FIG. 2) away from the seat portion 79.

The pilot body 62 has a cylindrical portion 74 formed at its right end in FIG. 2. The pilot spring 68, a spacer 93, a fail-safe disc 94, a retainer 95, a spacer 96, and a washer 97 are laminated inside the cylindrical portion 74 in the stated order from the left side in FIG. 2. The thus laminated components are fixed with a cap 98 that is fitted over an outer periphery of the cylindrical portion 74. The cap 98 has a passage 99 (cutout) that allows communication between the recessed portion 77 (valve chamber) and the flow path 35 defined along the outer periphery of the valve block 33.

The solenoid block 53 is formed by assembling and integrating a coil 55, cores 56 and 57, a plunger 58, and a hollow operating rod 59 coupled to the plunger 58 inside a solenoid case 54. A cover 60 is mounted to a right end of the solenoid case 54 in FIG. 2. When the coil 55 is energized, the plunger 58 generates a thrust force in accordance with a current value. The thrust force generated by the plunger 58 acts to move the valve body 78 in a direction toward the seat portion 79 (leftward in FIG. 2) against an urging force of the pilot spring 68, A left portion (press-fit portion 81) of the solenoid case 54 in FIG. 2 is press-fitted into a right opening of the case 25 in FIG. 2. An annular groove 82 is formed in an outer peripheral surface of the press-fit portion 81 of the solenoid case 54. In this embodiment, when a side wall of the case 25 is crimped with a crimping jig (not shown) toward the annular groove 82 of the solenoid case 54 to form a crimped portion 83 on the side wall of the case 25, the valve block 33 (damping unit) and the solenoid block 53 (actuating unit) that are inserted into the case 25 are fastened together and integrated with each other.

Then, when the coil 55 is not energized, the valve body 78 is urged rightward in FIG. 2 by the pilot spring 68 to bring the spring receiving portion 80 of the valve body 78 into abutment against (seat the spring receiving portion 80 on) the fail-safe disc 94. Meanwhile, when the coil 55 is energized, a thrust force in a leftward direction in FIG. 2 is generated in the plunger 58. Thus, the operating rod 59 is moved leftward in FIG. 2 against the urging force of the pilot spring 68 to thereby seat the valve body 78 on the seat portion 79. In this embodiment, a valve opening pressure for the valve body 78 is controlled by changing the current value to energize the coil 55. When the shock absorber operates in a soft mode in which the current value to energize the coil 55 is small and the urging force of the pilot spring 68 and the thrust force of the plunger 58 are balanced, the pilot valve 61 is opened by a certain valve opening amount (soft-characteristic valve opening amount).

When the piston rod is performing an extension stroke, the disc valve 14 for the piston 5 is closed due to an increase in pressure in the cylinder upper chamber 2A. Before the disc valve 13 is opened, the working liquid (the hydraulic fluid) on the cylinder upper chamber 2A side is pressurized. The pressurized working liquid is introduced into the damping force adjustment mechanism 31 via the passage 22, the annular flow path 21, the connection port 23, and the joint member 28. At this time, when the disc valve 17 of the base valve 10 is opened, the working liquid in amount corresponding to the movement of the piston 5 flows from the reservoir 4 into the cylinder lower chamber 2B. When the pressure in the cylinder upper chamber 2A reaches a valve opening pressure for the disc valve 13 for the piston 5 and the disc valve 13 is opened, the pressure in the cylinder upper chamber 2A is relieved to the cylinder lower chamber 2B. As a result, the pressure in the cylinder upper chamber 2A is prevented from excessively increasing.

When the piston rod is performing a compression stroke, the disc valve 14 for the piston 5 is opened and the disc valve 17 provided to the extension-side passage 15 in the base valve 10 is closed due to an increase in pressure in the cylinder lower chamber 2B. Before the disc valve 18 is opened, the working liquid in the piston lower chamber 2B flows into the cylinder upper chamber 2A. The working liquid in amount corresponding to a volume of a part of the piston rod 6, which has entered the cylinder 2, is introduced from the cylinder upper chamber 2A into the damping force adjustment mechanism 31 via the passage 22, the annular flow path 21, the connection port 23, and the flow path 36. When the pressure in the cylinder lower chamber 2B reaches a valve opening pressure for the disc valve 18 provided to the base valve 10 and the disc valve 18 is opened, the pressure in the cylinder lower chamber 2B is relieved to the reservoir 4. As a result, the pressure in the cylinder lower chamber 2B is prevented from excessively increasing.

The working liquid introduced into the damping force adjustment mechanism 31 passes through the introduction orifice 65, the shaft hole 76, the recessed portion 77, and the passages 72, causes the flexible disc 69 to be opened, and is introduced into the pilot chamber 71. Before the main valve 41 is opened (when a piston speed falls within a low speed range), the working liquid flowing into the recessed portion 77 passes through the pilot spring 68, the fail-safe disc 94, the washer 97, the passage 99, the flow path 35 defined along the outer periphery of the valve block 33, and the plurality of passages 27 formed in the inner flange portion 26 of the case 25 and flows to the reservoir 4.

When an increase in piston speed causes the pressure of the working liquid, which has been introduced into the annular passage 48 via the annular oil path 21, the flow path 36, and the passages 50, to reach a valve opening pressure for the main valve 41 and the main valve 41 is opened, the working liquid introduced into the annular passage 48 flows to the reservoir 4 via the flow path 35 defined along the outer periphery of the valve block 33 and the plurality of passages 27 formed in the inner flange portion 26 of the case 25.

As described above, both when the piston rod 6 is performing the extension stroke and when the piston rod 6 is performing the compression stroke, the damping force adjustment mechanism 31 generates a damping force resulting from the passage of the working liquid through the introduction orifice 65 and the pilot valve 61 before the main valve 41 is opened (when the piston speed falls within the low speed range). Further, after the main valve 41 is opened (when the piston speed falls within an intermediate speed range), the damping force adjustment mechanism 31 generates a damping force in accordance with an opening degree of the main valve 41. When the energization of the coil 55 is controlled to adjust a valve opening pressure for the pilot valve 61, the damping force generated by the damping force adjustment mechanism 31 can be directly controlled.

Further, when the thrust force of the plunger 58 is lost at the time of occurrence of a fail such as disconnection of the coil 55 or a failure of an in-vehicle controller, the valve body 78 is moved rightward in FIG. 2 by the urging force of the pilot spring 68 (also serving as a fail-safe spring) to thereby open the pilot valve 61. Further, when the spring receiving portion 80 of the valve body 78 is brought into abutment against the fail-safe disc 94, the communication between a flow path (reference symbol is omitted) inside the valve block 33 and a right part of the flow path 35 in FIG. 2 is interrupted.

The interruption of the communication adjusts a valve opening pressure for the fail-safe valve 91 to control a flow of the working liquid flowing from the annular oil path 21 to the reservoir 4 via the flow path 36 in the joint member 28, the introduction orifice 65 of the pilot pin 63, the shaft bole 76, the recessed portion 77 of the pilot body 62, a shaft hole of the washer 97, the passage 99 (cutout) formed in the cap 98, the flow path 35 defined along the outer periphery of the valve block 33, and the plurality of passages 27 formed in the inner flange portion 26 of the case 25. As a result, a certain damping force can be generated even at the time of occurrence of a fail. At the same time, the internal pressure of the pilot chamber 71 and, in turn, the valve opening pressure for the main valve 41 can be adjusted. Thus, a certain damping force can be obtained even at the time of occurrence of a fail.

As illustrated in FIG. 1, a bracket 90 to which, for example, a hose for a peripheral device is to be fixed is fixed to the outer tube 3 (outer cylinder). Further, a spring seat 84 that supports a suspension spring (not shown) of a suspension device is fixed to the outer tube 3. A distance between the spring seat 84 and the case 25 (damping force adjustment mechanism 31) is set larger than 0 mm and equal to or smaller than 30 mm. The spring seat 84 includes a cylindrical portion 85, a spring receiving portion 86 having an annular shape, and an insertion portion 87. The cylindrical portion 85 is press-fitted (fitted) over a first radially expanded portion 37 of the outer tube 3. The spring receiving portion 86 receives a lower end of the suspension spring. The insertion portion 87 is formed between the cylindrical portion 85 and the spring receiving portion 86 and is inserted into a lower end-side opening of the suspension spring.

The spring seat 84 has a round portion 88 formed between the cylindrical portion 85 and the insertion portion 87. When the round portion 88 abuts against an abutment portion 39 formed between the first radially expanded portion 37 and a second radially expanded portion 38 of the outer tube 3, the spring seat 84 is positioned in the axial direction (vertical direction in FIG. 1) with respect to the outer tube 3. Meanwhile, when the spring seat 84 is press-fitted over the outer tube 3, a positioning pin 102 (rotation restricting jig, see FIG. 5) of a spring seat fixing jig 101 described below is inserted into a positioning hole 89 (see FIG. 3) formed in the spring receiving portion 86. As a result, the spring seat 84 is positioned in a circumferential direction (about an axis) with respect to the outer tube 3.

Figure 4:
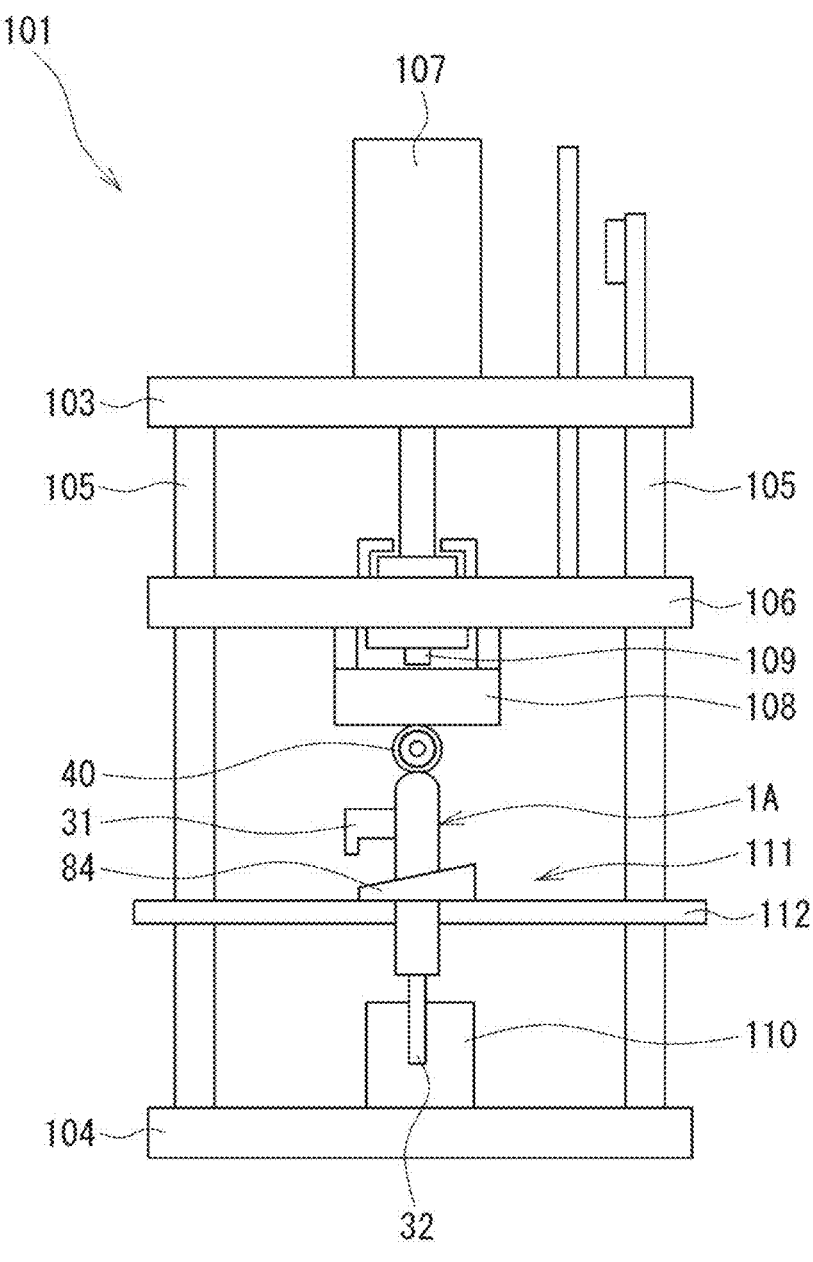
FIG. 4 is a conceptual diagram of a spring seat fixing jig to be used for a method of manufacturing a shock absorber according to the embodiment.

Next, the spring seat fixing jig 101 is described. For convenience of description, a workpiece to which the spring seat 84 is fixed in a spring-seat fixing step of fixing (press-fitting) the spring seat 84 over the outer tube 3 (outer cylinder) is referred to as "shock absorber main body 1A". FIG. 4 is a conceptual diagram of the spring seat fixing jig 101 in which the shock absorber main body 1A is placed.

As illustrated in FIG. 4, the spring seat fixing jig 101 includes an upper plate 103, a lower plate 104, four guide posts 105 (only two thereof are illustrated in FIG. 4), a vertically movable plate 106, a drive cylinder 107, and a pushing portion 108. The guide posts 105 are provided between the upper plate 103 and the lower plate 104. The vertically movable plate 106 is guided in the vertical direction along the guide posts 105. The drive cylinder 107 is provided on the upper plate 103 and drives the vertically movable plate 106 in the vertical direction. The pushing portion 108 is provided to the vertically movable plate 106 and pushes a bottom portion of the shock absorber main body 1A.

The bottom portion of the shock absorber main body 1A is a lower end of the shock absorber main body 1A. In this embodiment, the bottom portion of the shock absorber main body 1A is a mounting eye 40 fixed to an end opposite to a side toward which the piston rod 6 projects. Further, in this embodiment, when the mounting eye 40 is clamped by the pushing portion 108, the shock absorber main body 1A is positioned and fixed about the axis (in a rotating direction) with respect to the spring seat fixing jig 101. A force to push the mounting eye 40 (bottom portion of the shock absorber main body 1A) is monitored through a load cell 109 provided to the pushing portion 108.

The spring seat fixing jig 101 includes a workpiece support portion 111. The workpiece support portion 111 supports the shock absorber main body 1A upside down. Specifically, the shock absorber main body 1A is placed in the workpiece support portion 111 under a state in which the upper end 32 (another end) of the piston rod 6 projecting from the opening of the outer tube 3 is facing down. The workpiece support portion 111 includes a base plate 112 and a positioning mechanism (not shown). The base plate 112 is guided in the vertical direction along the guide posts 105. The positioning mechanism positions the base plate 112 in the vertical direction. A rod support portion 110 that supports the upper end 32 (another end) of the piston rod 6 is provided on the lower plate 104 of the spring seat fixing jig 101.

Figure 3:
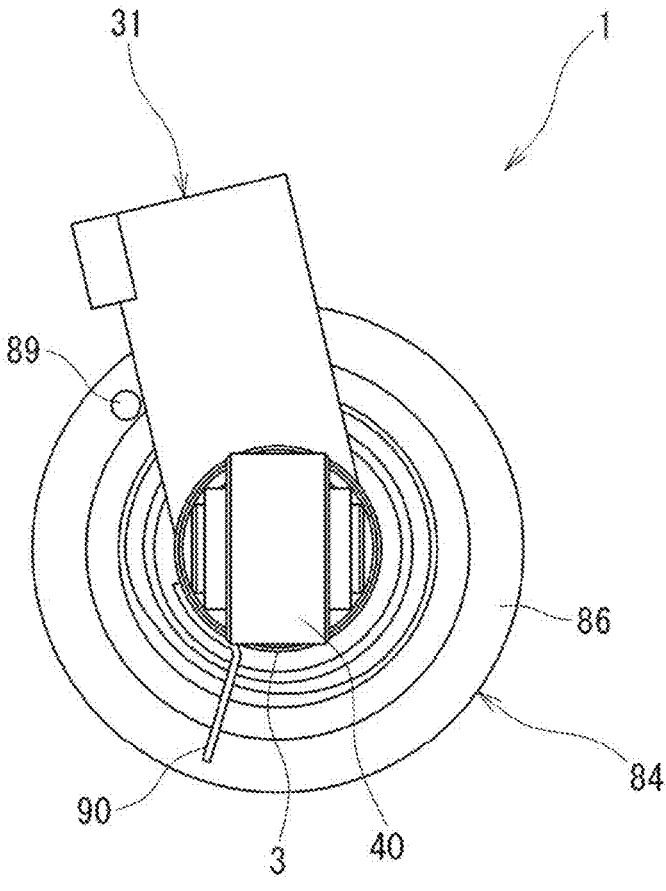
FIG. 3 is a view of the shock absorber according to the embodiment when viewed from a bottom portion side.
Figure 5:
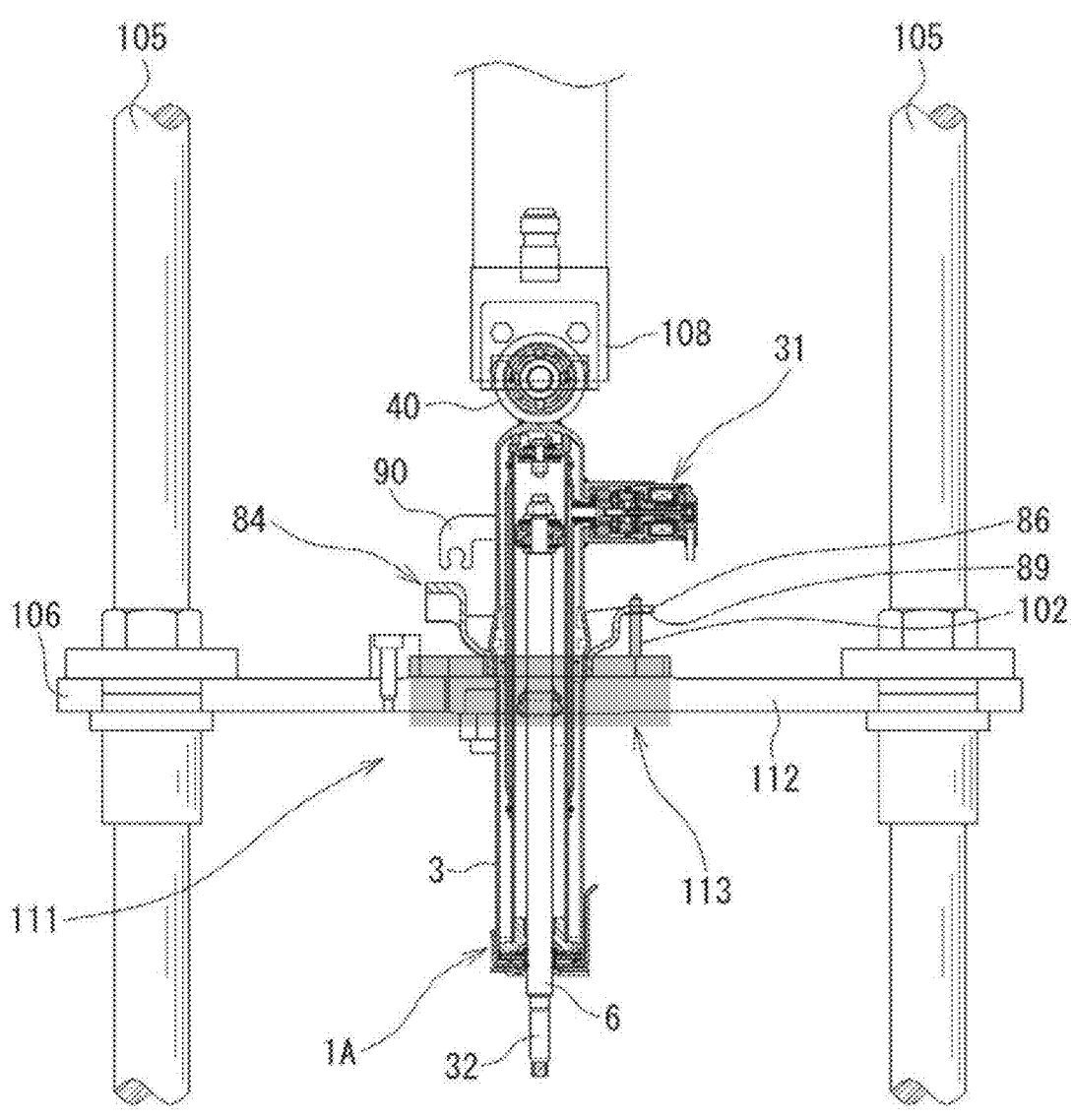
FIG. 5 is an explanatory view for illustrating a shock absorber main body that is placed in the spring seat fixing jig.

As illustrated in FIG. 5, a spring seat support portion 113 on which the spring seat 84 is to be placed is provided in a center of the base plate 112. The spring seat support portion 113 includes the positioning pin 102. When the positioning hole 89 formed in the spring receiving portion 86 of the spring seat 84 is inserted over the positioning pin 102, the spring seat 84 is positioned about the axis (in the rotating direction) with respect to the shock absorber main body 1A. As illustrated in FIG. 3, the positioning hole 89 formed in the spring seat 84 does not overlap the damping force adjustment mechanism 31 when viewed in the axial direction. Thus, at the time of press-fitting, interference of the positioning pin 102 of the spring seat fixing jig 101 with the damping force adjustment mechanism 31 is prevented.

Next, a method of manufacturing the shock absorber 1 according to this embodiment is described.

In this embodiment, a fastening step and the spring-seat fixing step are described. In the fastening step, the valve block 33 (damping unit) and the solenoid block 53 (actuating unit) of the damping force adjustment mechanism 31 provided to the side portion of the outer tube 3 (outer cylinder) of the shock absorber main body 1A are fastened together. In the spring-seat fixing step carried out after the fastening step, the spring seat 84 is fixed to the outer tube 3 of the shock absorber main body 1A.

(Fastening Step)

First, the opening 24 formed in the outer tube 3 and the connection port 23 of the separator tube 20 are coaxially aligned with each other. Under this state, the valve block 33 and the solenoid block 53 are inserted into the case 25 provided to the side portion of the outer tube 3. Next, the side wall of the case 25 is crimped toward the annular groove 82 of the solenoid case 54 to form the crimped portion 83 in the side wall of the case 25 to thereby fasten and integrate the valve block 33 and the solenoid block 53 with each other.

In this embodiment, an existing crimping jig is used as the crimping jig. Further, the crimping jig may be a jig configured to be pushed in a radial direction (vertical direction in FIG. 2) of the case 25 (damping force adjustment mechanism 31) or may be a jig configured to be pushed in an axial direction of the case 25 (horizontal direction in FIG. 2). After the fastening step, a bracket fixing step is carried out as needed. The bracket fixing stop is a step of joining (fixing) the bracket 90 between the second radially expanded portion 38 of the outer tube 3 (outer cylinder) and the bottom portion (mounting eye 40) (so that the bracket 90 is located closer to the bottom portion of the outer tube 3 than the spring seat 84).

(Spring-Seat Fixing Step)

First, the spring seat 84 is placed on the spring seat support portion 113 of the spring seat fixing jig 101. At this time, the positioning pin 102 of the spring seat support portion 113 is inserted into the positioning hole 89 formed in the spring receiving portion 86 of the spring seat 84 to thereby position the spring seat 84 about the axis (in the rotating direction) with respect to the spring seat fixing jig 101.

Next, the shock absorber main body 1A with the upper end 32 (another end) of the piston rod 6 facing down is inserted into the cylindrical portion 85 of the spring seat 84 that is placed on the spring seat support portion 113 of the spring seat fixing jig 101. When an upper end (lower end when the shock absorber main body 1A is placed upside down) of the first radially expanded portion 37 of the outer tube 3 (outer cylinder) is brought into abutment against the round portion 88 of the spring seat 84, downward movement of the shock absorber main body 1A with respect to the spring seat 84 is prevented. When the upper end 32 of the piston rod 6 is supported by the rod support portion 110 under the above-mentioned state, the placement of the shock absorber main body 1A in the workpiece support portion 111 of the spring seat fixing jig 101 is completed.

Next, after the vertically movable plate 106 of the spring seat fixing jig 101 is moved downward, the mounting eye 40 (bottom portion) of the shock absorber main body 1A is clamped with the pushing portion 108. Next, the drive cylinder 107 is actuated to push the shock absorber main body 1A downward with the pushing portion 108. Thus, the shock absorber main body 1A is pushed into the spring seat 84 to thereby press-fit the first radially expanded portion 37 of the outer tube 3 of the shock absorber main body 1A into the cylindrical portion 85 of the spring seat 84.

At this time, a force of the pushing portion 108 to push the bottom portion of the shock absorber main body 1A, in other words, a reaction force from the mounting eye 40 on the pushing portion 108 is monitored through the load cell 109. Thus, an excessive pushing force does not act on the shock absorber main body 1A. Further, the positioning pin 102 of the spring seat fixing jig 101 is inserted into the positioning hole 89 of the spring seat 84. Thus, when the mounting eye 40 (bottom portion of the shock absorber main body 1A) is being pushed with the pushing portion 108, rotation of the spring seat 84 about the axis with respect to the shock absorber main body 1A is deterred.

After the completion of press-fitting, the mounting eye 40 is released from the clamping with the pushing portion 108. Next, the drive cylinder 107 is actuated to move the vertically movable plate 106 including the pushing portion 108 upward to a predetermined height. Then, the shock absorber main body 1A to which the spring seat 84 is fixed, that is, the shock absorber 1 is removed from the workpiece support portion 111 of the spring seat fixing jig 101.

According to a related-art method of manufacturing a shock absorber, the shock absorber main body is placed in the workpiece support portion of the spring seat fixing jig under a state in which the upper end of the piston rod is facing up. The spring seat placed on the spring seat support portion of the spring seat fixing jig is pushed with the pushing portion driven by the drive cylinder to thereby fix (press-fit) the spring seat over the outer tube (outer cylinder) of the shock absorber main body.

At this time, in order to prevent the interference of the spring seat support portion of the spring seat fixing jig with the damping force adjustment mechanism for the shock absorber main body, a distance (for example, 35 mm or more) between the damping force adjustment mechanism and the spring seat in the axial direction is required to be ensured, imposing restrictions on a vehicle layout.

Thus, an attempt to fasten the damping unit and the actuating unit of the damping force adjustment mechanism together after fixing of the spring seat to the shock absorber main body (outer cylinder) has been made. In this case, however, a fastening jig disadvantageously interferes with the spring seat, sometimes failing to bring the fastening jig closer to the case that accommodates the damping force adjustment mechanism.

Meanwhile, in this embodiment, the valve block 33 (damping unit) and the solenoid block 53 (actuating unit) of the damping force adjustment mechanism 31 are inserted into the case 25 provided to the side portion of the outer tube 3 (outer cylinder) of the shock absorber main body 1A. Then, the fastening jig is pushed in the radial direction or the axial direction of the damping force adjustment mechanism 31 to thereby fasten the valve block 33 (damping unit) and the solenoid block 53 (actuating unit) together.

After that, the shock absorber main body 1A is placed upside down in the spring seat fixing jig 101 under a state in which the upper end 32 (another end) of the piston rod 6 is facing down. The bottom portion (mounting eye 40) of the shock absorber main body 1A is pushed with the pushing portion 108 of the spring seat fixing jig 101 to thereby fix (press-fit) the spring seat 84 over the outer tube 3 (outer cylinder) of the shock absorber main body 1A.

According to this embodiment, the spring seat support portion 113 of the spring seat fixing jig 101 is not arranged between the damping force adjustment mechanism 31 or the bracket 90 and the spring seat 84. In other words, the spring seat support portion 113 is arranged on the side opposite to the damping force adjustment mechanism 31 and the bracket 90 when viewed from the spring seat 84. Thus, the spring seat 84 can be fixed (press-fitted) over the shock absorber main body 1 (outer cylinder) without being restricted by the arrangement of the damping force adjustment mechanism 31 or the bracket 90.

According to this embodiment, a degree of freedom in designing of the shock absorber 1 is increased to improve a degree of freedom in layout of the shock absorber 1 in the vehicle.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2021-173087 filed on Oct. 22, 2021. All disclosed contents including Specification, Scope of Claims, Drawings, and Abstract of Japanese Patent Application No. 2021-173087 filed on Oct. 22, 2021 are incorporated herein by reference in their entirety.

REFERENCE SIGNS LIST 1 shock absorber, 1A shock absorber main body, 2 cylinder (inner cylinder), 3 outer tube (outer cylinder), 5 piston, 6 piston rod, 31 damping force adjustment mechanism, 33 valve block (damping unit), 53 solenoid block (actuating unit), 84 spring seat

The invention claimed is:

1. A method of manufacturing a shock absorber, the shock absorber comprising:

an inner cylinder;

an outer cylinder having a bottomed tubular shape, which defines, in combination with the inner cylinder, a reservoir;

a piston inserted into the inner cylinder;

a piston rod having one end coupled to the piston and another end extending to an outside through an opening of the outer cylinder;

a damping force adjustment mechanism provided to a side portion of the outer cylinder, the damping force adjustment mechanism including a damping unit capable of adjusting a damping force and an actuating unit capable of actuating the damping unit; and a spring seat, which is fixed to the outer cylinder and is configured to receive a suspension spring, the method comprising:

a fastening step of fastening the damping unit and the actuating unit together, which are provided to the side portion of the outer cylinder; and a spring-seat fixing step of fixing the spring seat to the outer cylinder after the fastening step, wherein the spring-seat fixing step comprises a pushing step of pushing a bottom portion of a shock absorber main body under a state in which the another end of the piston rod is facing down.

2. The method of manufacturing a shock absorber according to claim 1, wherein a distance between the damping force adjustment mechanism and the spring seat is set to 30 mm or less.

3. The method of manufacturing a shock absorber according to claim 1, wherein, in the fastening step, a jig is pushed in a radial direction of the damping force adjustment mechanism.

4. The method of manufacturing a shock absorber according to claim 1, wherein, in the fastening step, a jig is pushed in an axial direction of the damping force adjustment mechanism.

5. The method of manufacturing a shock absorber according to claim 1, further comprising, after the fastening step, a bracket fixing step of fixing a bracket to the outer cylinder so that the bracket is located at a position closer to a bottom portion of the outer cylinder than the spring seat.

* * * * *